United States Patent [19]

Takago et al.

[11] 4,376,192
[45] Mar. 8, 1983

[54] ROOM TEMPERATURE-CURABLE ORGANOPOLYSILOXANE COMPOSITIONS

[75] Inventors: Toshio Takago; Masatoshi Arai; Takeo Inoue; Masami Terashima, all of Annaka, Japan

[73] Assignee: Shin-Etsu Chemical Co., Ltd., Tokyo, Japan

[21] Appl. No.: 358,296

[22] Filed: Mar. 15, 1982

[30] Foreign Application Priority Data

Mar. 31, 1981 [JP] Japan .................................. 56-47550

[51] Int. Cl.$^3$ .......................................... C08G 77/04
[52] U.S. Cl. ........................................ 528/33; 524/785;
524/789; 524/783; 524/786; 524/788; 524/847;
524/860; 525/100; 525/104; 525/106; 525/477;
528/15; 528/16; 528/17; 528/18; 528/19;
528/901; 556/419
[58] Field of Search ................. 528/33, 901, 15, 16,
528/17, 18, 19; 525/100, 104, 106, 477;
524/789, 785, 786, 783, 788, 847, 860; 556/419

[56] References Cited

U.S. PATENT DOCUMENTS 2,919,173 12/1959 Roff ...................................... 556/419
3,674,738 7/1972 Nitzsche et al. ..................... 528/901

*Primary Examiner*—Melvyn I. Marquis
*Attorney, Agent, or Firm*—Toren, McGeady and Stanger

[57] ABSTRACT

The invention provides a novel room temperature-curable organopolysiloxane composition useful as an adhesive or a sealing material with remarkably extended workable time owing to the delayed surface filming. The base component in the composition is a conventional diorganopolysiloxane terminated with hydroxy groups at both molecular chain ends admixed with several known ingredients such as a cross linking agent, curing catalyst, filler and the like. The most characteristic ingredient in the composition effective to achieve the above mentioned desired property is a 1,1,1-trimethyl-3-hydrocarbyl-3,3-di(acylamino)disiloxane which belongs to a novel class of organopolysiloxane compounds and method is described for the preparation of these siloxane compounds.

9 Claims, No Drawings

ROOM TEMPERATURE-CURABLE ORGANOPOLYSILOXANE COMPOSITIONS

BACKGROUND OF THE INVENTION

The present invention relates to a room temperature-curable organopolysiloxane composition useful as an adhesive or, more particularly, to a novel room temperature-curable organopolysiloxane composition with extended tack-free time prepared by formulation a novel organopolysiloxane component.

There are hitherto known various types of organopolysiloxane composition useful as an adhesive curable at room temperature when exposed to a moisture-containing atmosphere with the crosslink formation by virtue of a crosslinking agent formulated therein. The principle or mechanism of crosslink formation leading to curing of the composition naturally depends on the kind of the crosslinking agent. In particular, several kinds of prior art room temperature-curable organopolysiloxane compositions contain an aminoxy-containing organopolysiloxane or organosilane as the crosslinking agent. Among the room temperature-curable organopolysiloxane compositions belonging to this class, those disclosed in Japanese Patent Publication No. 42-24545 contain both of a difunctional and trifunctional aminoxysilanes as the crosslinking agents formulated with the base component which is a linear diorganopolysiloxane terminated at both molecular chain ends with silanolic hydroxy groups. A problem in the room temperature-curable composition of this type is in the storability of the ready-mixed composition. That is, the composition prepared by blending all of the components together is rapidly gelled even in a hermetically sealed condition so that the composition cannot be stored with stability as a ready-mixed premix on one package. Therefore, it is a usual practice that the composition is prepared in two packages each containing different kind or combination of the components from the other and the contents of these two packages are blended together in a suitable proportion directly before use. It may be too much to say that the ready-mixed one-package type compositions are preferred to the two-package type compositions from the standpoint of working efficiency if the problem of storability is of no matter.

In order to solve the above mentioned problem in the storability of the ready-mixed composition, there has been proposed a room temperature-curable organopolysiloxane composition capable of giving a rubbery cured product, which is formulated with a difunctional amidosilane and a tri- or tetrafunctional aminoxysilane in place of the di- and trifunctional aminoxysilanes (see, for example, Japanese Patent Publication No. 52-30020). A problem in the room temperature curable composition of this type is the poor adhesion to the substrate surface to which the composition is applied and on which it is cured due to the liberation of a high-boiling amide compound in the course of the curing reaction. A remedy for the poor adhesion may be afforded by formulating the composition with an adhesion aid such as 3-aminopropyl triethoxysilane and the like although the addition of such an adhesion aid is undesirable due to the markedly poor curing performance of the composition admixed therewith. In addition, such a composition suffers from another problem of a relatively short workable time due to surface filming ranging, for example, from 15 to 40 minutes so that the application of the composition in the fields of civil engineering or building works is limited since the composition having been applied to a substrate surface must be finished by troweling hastily within a short time before the loss of workability of the composition by surface filming.

SUMMARY OF THE INVENTION

It is therefore an object of the present invention to provide a novel room temperature-curable organopolysiloxane composition useful as an adhesive or a sealing material, which is storable with stability as a ready-mixed premix of all components in one package and has a somewhat extended tack-free time or workable time capable of being worked with enough time before the loss of workability by surface filming.

The room temperature-curable organopolysiloxane composition of the invention comprises (a) 100 parts by weight of a diorganopolysiloxane having a substantially linear molecular structure with silanolic hydroxy groups as the terminal groups at both molecular chain ends expressed by the general formula

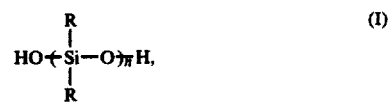

in which R is a monovalent hydrocarbon group and n is a positive integer giving the degree of polymerization of the organopolysiloxane, (b) from 1 to 20 parts by weight of a 1,1,1-trimethyl-3-hydrocarbyl-3,3-di(acylamino)disiloxane represented by the general formula

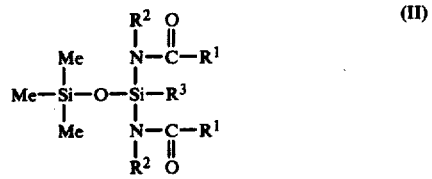

in which Me is a methyl group, $R^1$ is a hydrogen atom or an alkyl or aryl group, $R^2$ is an alkyl or aryl group and $R^3$ is an alkyl group having from 1 to 4 carbon atoms, vinyl group or phenyl group, (c) from 0.1 to 10 parts by weight of an aminoxy-containing organopolysiloxane expressed by the average unit formula

in which R has the same meaning as defined above, Y is a mono- or di(hydrocarbyl)-substituted aminoxy group, a is a positive number in the range from 0.5 to 2.96 inclusive and b is a positive number in the range from 0.04 to 1.0 inclusive with the proviso that a+b is in the range from 1 to 3 inclusive, (d) from 0.01 to 5 parts by weight of an organopolysiloxane expressed by the average unit formula

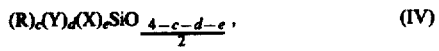

in which R and Y each have the same meaning as defined above, X is a group represented by the general formula

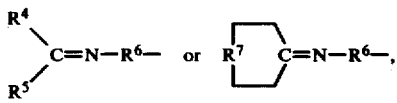

R⁴ being a monovalent hydrocarbon group free from aliphatic unsaturation R⁵ being a hydrogen atom or a monovalent hydrocarbon group free from aliphatic unsaturation, R⁶ being a divalent hydrocarbon group having at least 2 carbon atoms and R⁷ being a divalent hydrocarbon group having 4 to 8 carbon atoms, c is a positive number in the range from 0.5 to 2.96 inclusive, d is a positive number in the range from 0.03 to 1.0 inclusive and e is a positive number in the range from 0.01 to 1.0 inclusive with the proviso that c+d+e is in the range from 1 to 3 inclusive, (e) from 0.001 to 5 parts by weight of a curing catalyst, and (f) from 1 to 400 parts by weight of a filler.

Among the above named components, the disiloxane compound as the component (b) is a novel organosilicon compound not known in the art nor described in any literatures.

DETAILED DESCRIPTION OF THE PREFERRED EMBODIMENTS

In the following, detailed description is given first for each of the components (a) to (f).

The component (a) as the base ingredient of the inventive composition is a diorganopolysiloxane terminated at both molecular chain ends with silanolic hydroxy groups represented by the general formula (I) (referred to as the siloxane A hereinafter). Such a type of organopolysiloxane is well known in the art as the base component for formulation a room temperature-curable organopolysiloxane composition and need not be described in detail.

The monovalent hydrocarbon group bonded to the silicon atom and denoted by the symbol R can be an alkyl group such as methyl, ethyl and propyl groups, alkenyl group such as vinyl and allyl groups or aryl group such as phenyl group. Among the above named ones, methyl group is preferred. Those groups obtained by partially replacing the hydrogen atoms in the above named hydrocarbon groups with halogen atoms or other substituent atoms or groups are also suitable as the group R.

The average degree of polymerization given by the number n in the formula (I) should be in such a range that the siloxane A may have a viscosity of 100 to 1,000,000 centistokes at 25° C. or, preferably, 3,000 to 20,000 centistokes at 25° C. When the siloxane A has a viscosity lower than above, the organopolysiloxane composition formulated therewith cannot give a cured product with satisfactory mechanical properties while a siloxane A having a viscosity larger than above gives an organopolysiloxane composition with an excessively high consistency which is workable only with great difficulties. The siloxane A should desirably have a linear molecular structure but small amounts of branched chains may have no particular disadvantages on the properties of the inventive room temperature-curable compositions as well as the cured products thereof.

The component (b), which is referred to as the siloxane B hereinafter, is a disiloxane compound represented by the general formula (II) and, as is mentioned above, a compound forming a novel class of organosilicon compounds not known nor described in the prior art and discovered by the inventors in the course of their investigations for obtaining a room temperature-curable organopolysiloxane composition having satisfactory workability.

In the general formula (II), the symbol R¹ denotes a hydrogen atom or a monovalent hydrocarbon group similar to the monovalent hydrocarbon groups denoted by R in the general formula (I) for the siloxane A or, preferably, a methyl group. Similarly, R² is an alkyl or an aryl groups or, preferably, a methyl or ethyl group and R³ is an alkyl group having from 1 to 4 carbon atoms, preferably, a methyl or ethyl groups, a vinyl group or a phenyl group.

The siloxane B can readily be synthesized by the following procedure. Firstly, a monohydrocarbyl trichlorosilane R³SiCl₃, in which R³ has the same meaning as defined above, such as methyl trichlorosilane, is reacted with at least three times by moles of an acid amide R¹—CO—NH—R², in which R¹ and R² each have the same meaning as defined above, such as N-ethylacetamide, in the presence of an acceptor for hydrogen chloride such as triethylamine as diluted with a suitable organic solvent such as toluene to form a monohydrocarbyl tris(acylamino)silane of the general formula

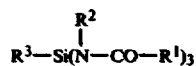

and then this intermediate compound is reacted with trimethylsilanol to give the final product, which is purified by filtration to remove the by-product salt and distillation under reduced pressure.

Several examples of the siloxane B compounds are as follows:

1,1,1,3-tetramethyl-3,3-di(N-ethylacetylamino)-disiloxane, which is a compound expressed by the general formula (II) where R¹ and R³ each being a methyl group and R² being an ethyl group;

1,1,1,3-tetramethyl-3,3-di(N-methylacetylamino)-disiloxane, which is a compound expressed by the general formula (II) where R¹, R² and R³ each being a methyl group;

1,1,1-trimethyl-3-vinyl-3,3-di(N-ethylacetylamino)-disiloxane, which is a compound expressed by the general formula (II) where R¹ being a methyl group, R² being an ethyl group and R³ being a vinyl group;

1,1,1-trimethyl-3-vinyl-3,3-di(N-methylacetylamino)-disiloxane, which is a compound expressed by the general formula (II) where R¹ and R² each being a methyl group and R³ being a vinyl group; and 1,1,1-trimethyl-3-phenyl-3,3-di(N-ethylacetylamino)-disiloxane which is a compound expressed by the general formula (II) where R¹ being a methyl group, R² being an ethyl group and R³ being a phenyl group.

The amount of this siloxane B in the inventive composition is preferably in the range from 1 to 20 parts by weight per 100 parts by weight of the component (a),i.e. the siloxane A. When the amount of the siloxane B is smaller than above, the rubbery elastomer obtained by curing the composition may have an extremely high elastic modulus while a composition containing the siloxane B in an amount in excess of 20 parts by weight cannot exhibit good curing characteristics in addition to the poor performance as an adhesive due to the presence of the siloxane B in the free state if not to mention the economical disadvantage by the use of so much amount of the relatively expensive siloxane B. It is also a preferable condition that this siloxane B is used in a larger amount than the undermentioned component (c).

The component (c), which is referred to as the siloxane C hereinafter, is an aminoxy-containing organopolysiloxane expressed by the average unit formula (III) above. In the average unit formula (III), R is a monovalent hydrocarbon group which may be the same as or different from the group R in the siloxane A described above. The symbol Y denotes an aminoxy group or, preferably, a hydrocarbyl-substituted aminoxy group represented by the general formula

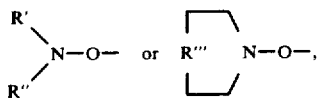

in which R' and R" are each a hydrogen atom or a monovalent hydrocarbon group and R''' is a divalent hydrocarbon group. Several examples of such aminoxy groups, where Me, Et and Pr are each a methyl, ethyl and propyl group, respectively, are as follows: Me—N-H—O—; Et—NH—O—; Pr—NH—O—; Me$_2$N—O—; Et$_2$N—O—; Pr$_2$N—O—;

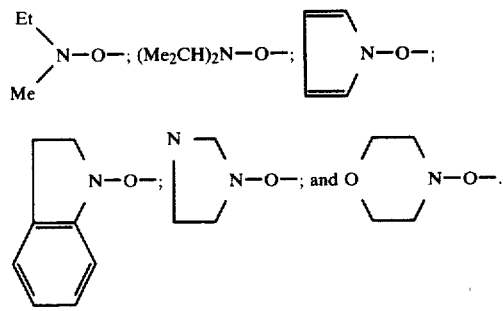

The suffixes a and b in the average unit formula (II) are each an averaged number as defined before to give the number of the respective group R and Y per silicon atom. It is preferable that the siloxane C has at least three aminoxy groups in a molecule.

The method for the preparation of the siloxane C is, for example, as follows. Thus, an organohydrogenpolysiloxane having, preferably, at least three hydrogen atoms directly bonded to the silicon atoms in a molecule is subjected to the dehydrogenation reaction with a hydroxylamine compound expressed by the general formula Y—H, in which Y has the same meaning as defined before, at a temperature of −20 to 150° C. or, preferably, 0° to 80° C. When some of the hydrocarbon groups R are higher than methyl, e.g. propyl and butyl, the corresponding propyl- or butyl-containing organohydrogenpolysiloxane can be prepared starting with the partial hydrosilation of a methylhydrogenpolysiloxane and an unsaturated hydrocarbon compound, e.g. olefin, in the presence of a platinum catalyst to leave, preferably, at least three silicon-bonded hydrogen atoms in a molecule to be subsequently reacted with a hydroxylamine compound Y—H as mentioned above.

The siloxane C serves in the inventive organopolysiloxane composition as a crosslinking agent cooperatively with the undermentioned component (d).

The molecular configuration of the siloxane C may be linear, cyclic or three-dimensional according to the values of the suffixes a and b. Several of the examples of the siloxane C compounds are as follows, in which Me, Pr and Bu are each a methyl, propyl or butyl group, respectively, and $Y^1$ is a dimethylaminoxy group:

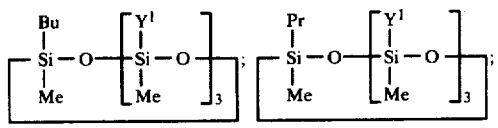

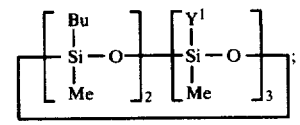

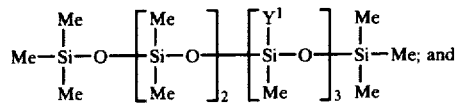

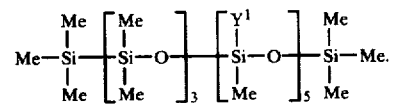

The component (d) is an organopolysiloxane represented by the average unit formula (IV) above, which is referred to as the siloxane D hereinafter. In the average unit formula (IV), the group denoted by R is a monovalent hydrocarbon group which may be the same as or different from the monovalent hydrocarbon groups R in the components (a) and (c) and the group denoted by Y is an aminoxy group similar to the group Y in the component (c).

The group denoted by X in the average unit formula (IV) for the component (d) is a group expressed by the general formula

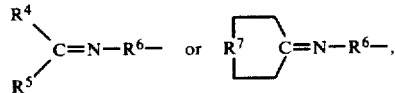

in which $R^4$, $R^5$, $R^6$ and $R^7$ each have the meaning as given before. In particular, $R^4$ and $R^5$ each can be a monovalent hydrocarbon group free from aliphatic unsaturation exemplified by alkyl groups such as methyl, ethyl, propyl, isopropyl, butyl, isobutyl and sec-butyl groups, aryl groups such as phenyl group and aralkyl groups such as benzyl group. The divalent hydrocarbon group denoted by $R^6$ is preferably an alkylene group having at least two carbon atoms such as ethylene, propylene and butylene groups and the divalent hydrocarbon group denoted by $R^7$ is preferably an alkylene group having from 4 to 8 carbon atoms such as tetramethylene, pentamethylene and octamethylene groups.

The values of the suffixes c, d and e are as defined before and the molecular configuration of the siloxane D may be linear, cyclic or three-dimensional depending on these values.

The siloxane D can be prepared in the following manner. Thus, a hydrocarbylidene alkenylimine compound, such as isopropylidene allylimine Me$_2$C=N—CH$_2$—CH=CH$_2$, 1-ethylpropylidene allylimine Et$_2$C=N—CH$_2$—CH=CH$_2$ and sec-butylidene allylimine

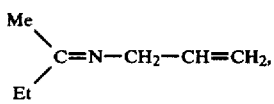

and an organohydrogenpolysiloxane are subjected partially to the addition reaction, i.e. hydrosilation, at a temperature of 20° to 150° C. or, preferably, 60° to 120° C. in the presence of a platinum catalyst to form an addition product having several unreacted hydrogen atoms directly bonded to the silicon atoms, which is then subjected to a dehydrogenation reaction with a hydroxylamine compound expressed by the general formula Y—H, where Y has the same meaning as before, at a temperature of −20° to 150° C. or, preferably, 0° to 80° C. to give the final product.

This siloxane D serves as a crosslinking agent and exhibits an effect to enhance the adhesion of the cured composition on to the substrate surface. It is desirable that the siloxane D has at least one group denoted by X and at least three groups denoted by Y in a molecule.

Several examples of the siloxane D compounds are given by the following structural formulas, in which Me, Bu and Ph are each a methyl, butyl or phenyl group, respectively, X$^1$ is a group expressed by Me$_2$C=N—C$_3$H$_6$—, X$^2$ is a group expressed by

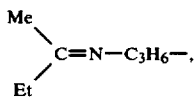

X$^3$ is a group expressed by Et$_2$C=N—C$_3$H$_6$—, Y$^2$ is a diethylaminoxy group, Y$^3$ is a methylethylaminoxy group and Y$^4$ is a piperidinoxy group:

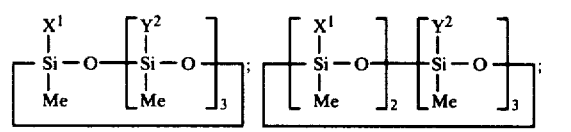

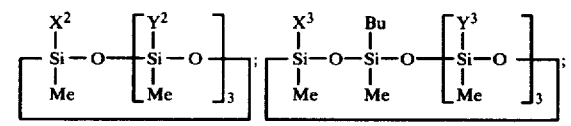

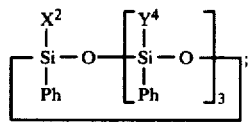

-continued

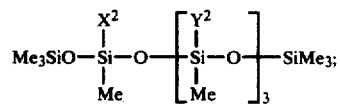

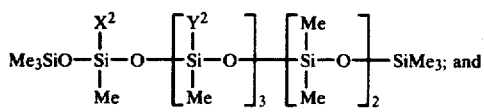

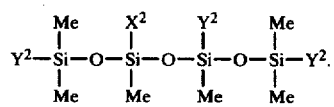

The amounts of the components (c) and (d), i.e. the siloxanes C and D, in the inventive composition should be preferably in the ranges from 0.1 to 10 parts by weight and 0.01 to 5 parts by weight, respectively, per 100 parts by weight of the component (a). It is further noted that the total amount of the components (c) and (d) should not exceed 10 parts by weight per 100 parts by weight of the component (a) since otherwise the velocity of the curing reaction is unduly reduced and no good rubbery cured product can be obtained in addition to the poor adhesive bonding and the economical disadvantage due to the use of excessive amounts of these relatively expensive siloxanes.

The above exemplified siloxanes C or D as the component (c) or (d) may be used either singly or as a combination of two kinds or more according to need. Whereas the siloxane C or D has preferably at least three groups denoted by Y bonded to the silicon atoms in a molecule, it is optional that the siloxane D is partly replaced with a similar siloxane compound having only two groups denoted by Y in a molecule.

The component (e) is a curing catalyst and several examples of the curing catalyst include metal salts of carboxylic acids such as lead di(2-ethylhexoate), dibutyltin diacetate, dibutyltin dilaurate, dibutyltin tri(2-ethylhexoate), iron 2-ethylhexoate, cobalt 2-ethylhexoate, manganese 2-ethylhexoate, zinc 2-ethylhexoate, tin (II) caprylate, tin naphthenate, tin oleate, tin butyrate, titanium naphthenate, zinc naphthenate, cobalt naphthenate and zinc stearate, organic titanate esters such as tetrabutyl titanate, tetra(2-ethylhexyl) titanate and tetra(isopropenyloxy) titanate and aluminum salts of organic acids.

The amount of the curing catalyst as the component (e) is in the range from 0.001 to 5 parts by weight or, preferably, from 0.01 to 1 part by weight per 100 parts by weight of the component (a). When the amount of the curing catalyst is smaller than above, the velocity of curing of the composition on the surface is extremely low sometimes not resulting in the disappearance of the surface tackiness while a composition admixed with the curing catalyst in an amount over 5 parts by weight is undesirable because of the poor storability.

The component (f) is a filler which may be a conventional one used in the art including fumed silica, precipitated silica, quartz powder, diatomaceous earth, aluminum oxide, titanium dioxide, iron oxide, lead oxide, carbon black, bentonite, graphite powder, calcium carbonate, mica flakes, clay, glass beads, glass microballoons, Shirasu balloons and beads of thermoplastic resins such as polyvinyl chloride, polystyrene and polymethyl methacrylate.

The amount of the filler in the inventive composition is usually in the range from 1 to 400 parts by weight or, preferably, from 50 to 150 parts by weight per 100 parts by weight of the component (a). A cured product obtained from a composition formulated with an insufficient amount of the filler has poor mechanical strengths while a composition containing the filler in excess of 400 parts by weight cannot give a good rubbery elastomer by curing.

The room temperature-curable organopolysiloxane composition of the invention is prepared by merely blending the above described components (a) to (f) in a dry atmosphere of air or nitrogen into a uniform blend. The inventive composition is very stable and storable even when all of the components have been blended together insofar as the thus prepared composition is kept under a hermetically sealed condition although it is optional that the composition is prepared in two packages each containing different components and the contents of these two packages are blended together directly before use.

Whereas the inventive composition has excellent storability when kept under a hermetically sealed or anhydrous condition, it is rapidly cured into a rubbery elastomer when exposed to atmospheric air containing moisture even at room temperature.

In the following, examples are given to illustrate the present invention in further detail, in which the preparation and identification of several of the siloxane B compounds are first given.

EXAMPLE 1

Into a reaction mixture composed of 149.5 g (1 mole) of methyltrichlorosilane, 2200 g of toluene and 767 g (7.53 moles) of triethylamine were added dropwise 290 g (3.33 moles) of N-ethylacetamide over a period of 2 hours. The reaction immediately took place exothermically so that the temperature of the reaction mixture was increased from 25° C. before the addition of N-ethylacetamide to 50° C. at the end of the addition of the amide.

After the end of the addition of the amide, the reaction mixture was further agitated for 30 minutes and then 90 g (1 mole) of trimethylsilanol were added thereinto dropwise over a period of 30 minutes. Thereafter, the temperature of the reaction mixture was increased to 60° C. where agitation of the reaction mixture was further continued for additional 2 hours to complete the reaction. After cooling to room temperature, the triethylamine hydrochloride precipitated in the mixture was separated by filtration and the filtrate was first subjected to stripping of toluene under reduced pressure and then distilled under reduced pressure to give 160 g of a fraction boiling at 102° C. under a pressure of 1.5 mmHg. The results of the elementary analysis and molecular weight determination given below as well as the infrared absorption spectroscopy supported that this fraction is the desired 1,1,1,3-tetramethyl-3,3-di(N-ethylacetylamino)disiloxane. The above given yield of the product corresponded to about 53% of the theoretical value. This product is called the siloxane B-1 hereinafter.

| Elementary analysis: | Calculated as $C_{12}H_{28}O_3N_2Si_2$, % | Found, % |
|---|---|---|
| C | 47.37 | 47.69 |
| H | 9.21 | 9.45 |
| N | 9.21 | 9.29 |

Molecular weight by mass spectroscopy: 304($C_{12}H_{28}O_3N_2Si_2$=304).

Refractive index $n_D^{25}$: 1.4445.

EXAMPLE 2

The experimental procedure was substantially the same as in Example 1 except that 243 g (3.33 moles) of N-methylacetamide were used in place of N-ethylacetamide. The distillation of the reaction mixture under reduced pressure gave 149 g of a fraction boiling at 116° C. under a pressure of 4.5 mmHg. The results of the elementary analysis and the molecular weight determination by mass spectroscopy given below as well as the infrared absorption spectroscopy supported that the compound of the above fraction was the desired 1,1,1,3-tetramethyl-3,3-di(N-methylacetylamino)disiloxane.

The above given yield of the product corresponded to about 54% of the theoretical value. This product is called the siloxane B-2 hereinafter.

| Elementary analysis: | Calculated as $C_{10}H_{24}O_3N_2Si_2$, % | Found, % |
|---|---|---|
| C | 43.48 | 43.48 |
| H | 8.70 | 8.65 |
| N | 10.14 | 10.07 |

Molecular weight by mass spectroscopy: 276 ($C_{10}H_{24}O_3N_2Si_2$=276).

Refractive index $n_D^{25}$: 1.4492.

EXAMPLE 3

The experimental procedure was substantially the same as in Example 1 except that 161.5 g (1 mole) of vinyl trichlorosilane were used in place of methyl trichlorosilane. The distillation of the reaction mixture under reduced pressure gave 193 g of a fraction boiling at 106°-108° C. under a pressure of 1.5 mmHg. The results of the elementary analysis and the molecular weight determination by mass spectroscopy given below as well as the infrared absorption spectroscopy supported that the compound of the above fraction was the desired 1,1,1-trimethyl-3-vinyl-3,3-di(N-ethylacetylamino)disiloxane. The above given yield of the product corresponded to about 61% of the theoretical value. This product is called the siloxane B-3 hereinafter.

| Elementary analysis: | Calculated as $C_{13}H_{28}O_3N_2Si_2$, % | Found, % |
|---|---|---|
| C | 49.37 | 49.45 |
| H | 8.86 | 8.92 |
| N | 8.86 | 8.76 |

Molecular weight by mass spectroscopy: 316 ($C_{13}H_{28}O_3N_2Si_2$=316).

Refractive index $n_D^{25}$: 1.4545.

EXAMPLE 4

The experimental procedure was substantially the same as in Example 3 except that 243 g (3.33 moles) of N-methylacetamide were used in place of the N-ethylacetamide. The distillation of the reaction mixture under reduced pressure gave 150 g of a fraction boiling at 121° C. under a pressure of 3 mmHg. The results of the elementary analysis and the molecular weight determination by mass spectroscopy given below as well as the infrared absorption spectroscopy supported that the compound of the above fraction was the desired 1,1,1-trimethyl-3-vinyl-3,3-di(N-methylacetylamino)disiloxane. The above given yield of the product corresponded to about 44% of the theoretical value. This product is called the siloxane B-4 hereinafter.

| Elementary analysis: | Calculated as $C_{11}H_{24}O_3N_2Si_2$, % | Found, % |
|---|---|---|
| C | 45.83 | 45.80 |
| H | 8.33 | 8.42 |
| N | 9.72 | 9.80 |

Molecular weight by mass spectroscopy: 288 ($C_{11}H_{24}O_3N_2Si_2 = 288$).

Refractive index $n_D^{25}$: 1.4570.

EXAMPLE 5

The experimental procedure was substantially the same as in Example 1 except that 211.6 g (1 mole) of phenyl trichlorosilane were used in place of the methyl trichlorosilane. The distillation of the reaction mixture under reduced pressure gave 161 g of a fraction boiling at 146° C. under a pressure of 2 mmHg. The results of the elementary analysis and the molecular weight determination by mass spectroscopy given below as well as the infrared absorption spectroscopy supported that the compound of the above fraction was the desired 1,1,1-trimethyl-3-phenyl-3,3-di(N-ethylacetylamino)disiloxane. The above given yield of the product corresponded to about 44% of the theoretical value. This product is called the siloxane B-5 hereinafter.

| Elementary analysis: | Calculated as $C_{17}H_{32}O_3N_2Si_2$, % | Found, % |
|---|---|---|
| C | 55.74 | 55.69 |
| H | 8.20 | 8.23 |
| N | 7.65 | 7.75 |

Molecular weight by mass spectroscopy: 366 ($C_{17}H_{32}O_3N_2Si_2 = 366$).

Refractive index $n_D^{25}$: 1.4848.

EXAMPLE 6

Into 60 g of 1,3,5,7-tetramethyl-1-propylcyclotetrasiloxane in a flask equipped with a stirrer and a thermometer were added 60 g of diethylhydroxylamine dropwise at room temperature under an atmosphere of nitrogen gas over a period of 30 minutes with agitation followed by gradual temperature increase to 60° C. where agitation of the mixture was further continued for 60 minutes. Stripping of the reaction mixture under reduced pressure gave 92 g of a colorless, clear liquid which was identified to be the desired 1,3,5,7-tetramethyl-1-propyl-3,5,7-tri(diethylaminoxy)cyclotetrasiloxane. This compound is called the siloxane C-1 hereinafter.

EXAMPLE 7

Into a flask equipped with a stirrer and a thermometer were introduced 60 g of 1,3,5,7-tetramethylcyclotetrasiloxane, 60 g of toluene and 0.034 g of an isopropyl alcohol solution containing 0.2% of chloroplatinic acid as platinum to form a uniform mixture and 18 g of sec-butylidene allylimine of the formula

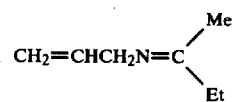

were added dropwise into the mixture kept at 80° C. under agitation. The reaction was completed by continuing agitation for further 1 hour and stripping of the resultant reaction mixture under reduced pressure gave a colorless, clear liquid product. The determination of the hydrogen atoms directly bonded to the silicon atoms and the content of nitrogen gave results that the contents of the silicon-bonded hydrogen atoms and nitrogen were 8.60 meq./g and 4.1%, respectively, in good coincidence with the expected theoretical values of 8.55 meq./g and 4.0%, respectively, supporting that the product was a cyclic siloxane expressed by the structural formula

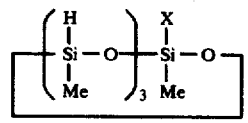

in which X is a group expressed by the formula

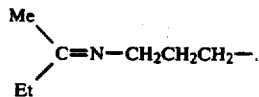

In the next place, 50 g of the above obtained cyclic siloxane product were added dropwise into 48 g of diethylhydroxylamine kept at room temperature under an atmosphere of nitrogen gas over a period of 30 minutes followed by gradual temperature increase to 60° C. where the reaction mixture was agitated for further 1 hour to complete the reaction. Stripping of the reaction mixture under reduced pressure at a temperature below 60° C. gave 82 g of a light yellow liquid product.

The results of the analysis undertaken with this liquid product that the compound contained no silicon-bonded hydrogen atoms and the nitrogen content thereof was 9.1% were in good coincidence with the expected theoretical results of absence of silicon-bonded hydrogen atoms and 9.2% of the nitrogen content and supported that the product compound was expressed by the structural formula

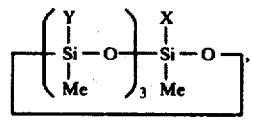

in which X has the same meaning as defined above and Y denotes a diethylaminoxy group. This compound is called the siloxane D-1 hereinafter.

EXAMPLE 8

The experimental procedure was substantially the same as in Example 7 except that the starting cyclic siloxane was replaced with 1,1,1,3,5,7,9,11,11,11-decamethylhexasiloxane. The resultant product was identified to be a siloxane compound expressed by the formula

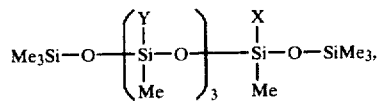

in which X and Y each have the same meaning as defined above, as being supported by the analytical results that the compound contained no silicon-bonded hydrogen atoms and the nitrogen content thereof was 7.4% in good coincidence with the results expected from the above given structural formula. This siloxane compound is called the siloxane D-2 hereinafter.

EXAMPLE 9

Eight kinds of organopolysiloxane compositions I to VIII were prepared each according to the formulation and procedure given below, of which Compositions VII and VIII were for comparative purpose. In the following formulations, "parts" always refers to "parts by weight".

Composition I: 100 parts of a dimethylpolysiloxane of linear structure terminated at both molecular chain ends with silanolic hydroxy groups and having a viscosity of about 20,000 centistokes at 25° C. (hereinafter referred to as the siloxane A-1) were admixed with 100 parts of a precipitated calcium carbonate and well blended. The blend was further admixed with 8 parts of the siloxane B-1 (see Example 1), 2.0 parts of the siloxane C-1 (see Example 6), 0.5 part of the siloxane D-1 (see Example 7) and 0.2 part of dibutyltin dioctoate and blended under an anhydrous condition. The thus prepared siloxane composition was stored in a hermetically sealed container to exclude any moisture.

Composition II: the blend of the siloxane A-1 and the precipitated calcium carbonate in equal amounts by weight was dehydrated by heating at 120° C. for 3 hours under a reduced pressure of 5 mmHg. The thus obtained dehydrated blend is called the base blend hereinafter. An organopolysiloxane composition was prepared by admixing 200 parts of the base blend with 6 parts of the siloxane B-1 (see Example 1), 2.0 parts of the siloxane C-1 (see Example 6), 0.5 part of the siloxane D-1 (see Example 7) and 0.2 part of dibutyltin dioctoate under an anhydrous condition and stored in a hermetically sealed container.

Compositions III to VIII: the procedure for the preparation of each of these compositions was substantially the same as in the preparation of the Composition II except for the formulation. The formulations of these compositions in parts are shown in Table 1 below together with the formulation for the Composition II.

TABLE 1

| Composition | II | III | IV | V | VI | VII | VIII |
|---|---|---|---|---|---|---|---|
| Base blend | 200 | 200 | 200 | 200 | 200 | 200 | 200 |
| Siloxane B-1 | 6 | 4 | 4 | 4 | — | — | — |
| Siloxane B-3 | — | — | — | — | 4 | — | — |
| Bis(N—methyl-acetylamino)methyl vinyl silane | — | — | — | — | — | 4 | — |
| Bis(N—methyl-acetylamino)dimethylsilane | — | — | — | — | — | — | 4 |
| Siloxane C-1 | 2 | 2 | 3 | 2 | 1.5 | 2 | 2 |
| Siloxane D-1 | 0.5 | 0.5 | 0.5 | 0.5 | — | — | — |
| Siloxane D-2 | — | — | — | — | 0.5 | — | — |
| Dibutyltin dioctoate | 0.2 | 0.2 | 0.2 | 0.01 | — | — | — |
| Dibutyltin dilaurate | — | — | — | — | 0.2 | — | — |

Each of the above prepared organopolysiloxane composition I to VIII was shaped into a sheet of 2 mm thickness, which was cured into a rubbery elastomer on standing for 7 days at room temperature. The time for the film formation on the surface of the compositions and the mechanical properties, i.e. tensile strength, ultimate elongation and hardness of the cured sheets were determined according to JIS K 6301 to give the results shown in Table 2 below.

TABLE 2

| Composition | | I | II | III | IV | V | VI | VII | VIII |
|---|---|---|---|---|---|---|---|---|---|
| Time for filming, minutes | | 120–180 | 120–180 | 120–180 | 120–180 | 120–180 | 120–180 | 20 | 50 |
| cured sheet | Hardness (JIS) | 15 | 14 | 15 | 16 | 12 | 16 | 16 | 15 |
| | Tensile Strength Kg/cm² | 12 | 11 | 13 | 13 | 9 | 12 | 12 | 10 |
| | Ultimate elongation, % | 1400 | 1550 | 1600 | 1530 | 1700 | 1580 | 1530 | 1210 |

EXAMPLE 10

Adhesive bonding strength obtained by use of the organopolysiloxane compositions I to VIII prepared in the preceding example as the adhesive agent was examined for three kinds of test panels. The test panels used include glass plates by floating process, surface-anodized aluminum plates coated with a baking-finish methacrylic varnish as specified in JIS H 4000 and JIS A 5052P and cured mortar plates as specified in JIS R 5210.

Each pair of the test panels was bonded together at the center portions of the panels with a small amount of the organopolysiloxane composition according to JIS A 5758 to give a test specimen having an H-wise side view and kept standing first in an atmosphere of 55% relative humidity at 20° C. for 14 days and then in an atmosphere at 30° C. for 14 days to have the organopolysiloxane composition cured. The thus bonded test panels were pulled apart in an automatic recording tensile tester at a pulling rate of 50 mm/minute to determine the maximum tensile stress before rupture, tensile modulus at 50% elongation and elongation of the cured composition at rupture. The results of this tensile test are shown in Table 3 below. Meanwhile, the rupture of the test specimens always occurred within the body of the cured organopolysiloxane composition when the Compositions I to VI were used as the adhesive while rupture of the test specimens occurred at the interface between the test panel and the cured composition when the Compositions VII and VIII were used.

TABLE 3

| | Test panel | Organopolysiloxane composition | | | | | | | |
|---|---|---|---|---|---|---|---|---|---|
| | | I | II | III | IV | V | VI | VII | VIII |
| Modulus at 50% elongation, kg/cm² | A | 1.4 | 1.5 | 1.5 | 1.6 | 1.3 | 1.5 | 2.0 | 2.5 |
| | B | 1.5 | 1.5 | 1.6 | 1.6 | 1.5 | 1.4 | 2.1 | 2.4 |
| | C | 1.4 | 1.6 | 1.4 | 1.5 | 1.3 | 1.4 | 2.1 | 2.3 |
| Maximum tensile stress, kg/cm² | A | 6.0 | 5.8 | 5.7 | 5.9 | 5.4 | 6.2 | 3.2 | 3.3 |
| | B | 5.9 | 5.7 | 5.8 | 5.7 | 5.3 | 5.4 | 3.3 | 3.5 |
| | C | 6.2 | 5.9 | 6.0 | 6.0 | 5.4 | 5.9 | 3.1 | 3.2 |
| Elongation at rupture, % | A | 800 | 820 | 790 | 790 | 700 | 820 | 350 | 340 |
| | B | 790 | 850 | 860 | 840 | 710 | 810 | 350 | 390 |
| | C | 850 | 890 | 880 | 870 | 700 | 830 | 340 | 360 |

Test panel
A: glass;
B: aluminum;
C: mortar

What is claimed is:

1. A room temperature-curable organopolysiloxane composition which comprises
  (a) 100 parts by weight of a diorganopolysiloxane having a substantially linear molecular structure with silanolic hydroxy groups as the terminal groups at both molecular chain ends expressed by the general formula

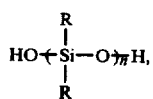

in which R is a monovalent hydrocarbon group and n is a positive integer giving the degree of polymerization of the di organopolysiloxane,
  (b) from 1 to 20 parts by weight of a 1,1,1-trimethyl-3-hydrocarbyl-3,3-di(acylamino)disiloxane represented by the general formula

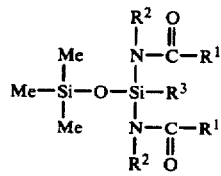

in which Me is a methyl group, R¹ is a hydrogen atom or an alkyl or aryl group, R² is an alkyl or aryl group and R³ is an alkyl group having from 1 to 4 carbon atoms, vinyl group or phenyl group,
  (c) from 0.1 to 10 parts by weight of an aminoxy-containing organopolysiloxane expressed by the average unit formula

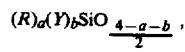

in which R has the same meaning as defined above, Y is a mono- or di(hydrocarbyl)-substituted aminoxy group, a is a positive number in the range from 0.5 to 2.96 inclusive and b is a positive number in the range from 0.04 to 10 inclusive with the proviso that a+b is in the range from 1 to 3 inclusive,
  (d) from 0.01 to 5 parts by weight of an organopolysiloxane expressed by the average unit formula

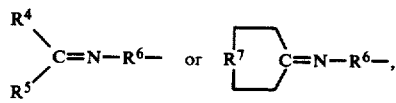

in which R and Y each have the same meaning as defined above, X is a group represented by the general formula

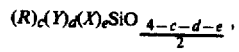

R⁴ being a monovalent hydrocarbon group free from aliphatic unsaturation, R⁵ being a hydrogen atom or a monovalent hydrocarbon group free from aliphatic unsaturation, R⁶ being a divalent hydrocarbon group having at least 2 carbon atoms and R⁷ being a divalent hydrocarbon group having 4 to 8 carbon atoms, c is a positive number in the range from 0.5 to 2.96 inclusive, d is a positive number in the range from 0.03 to 1.0 inclusive and e is a positive number in the range from 0.01 to 1.0 inclusive with the proviso that c+d+e is in the range from 1 to 3 inclusive,
  (e) from 0.001 to 5 parts by weight of a curing catalyst, and
  (f) from 1 to 400 parts by weight of a filler.

2. The room temperature-curable organopolysiloxane composition as claimed in claim 1 wherein the diorganopolysiloxane as the component (a) has a viscosity in the range from 100 to 10,000,000 centistokes at 25° C.

3. The room temperature-curable organopolysiloxane composition as claimed in claim 1 wherein the monovalent hydrocarbon group denoted by R¹ is a methyl group.

4. The room temperature-curable organopolysiloxane composition as claimed in claim 1 wherein the group denoted by R² is a methyl or an ethyl group.

5. The room temperature-curable organopolysiloxane composition as claimed in claim 1 wherein the alkyl group denoted by R³ is a methyl or an ethyl group.

6. The room temperature-curable organopolysiloxane composition as claimed in claim 1 wherein the divalent hydrocarbon group denoted by $R^6$ is an alkylene group having at least two carbon atoms.

7. The room temperature-curable organopolysiloxane composition as claimed in claim 1 wherein the component (d) has at least one group denoted by X and at least three groups denoted by Y in a molecule.

8. The room temperature-curable organopolysiloxane composition as claimed in claim 1 wherein the total amount of the components (c) and (d) does not exceed 10 parts by weight per 100 parts by weight of the component (a).

9. A 1,1,1-trimethyl-3-hydrocarbyl-3,3-di(acylamino)disiloxane represented by the general formula

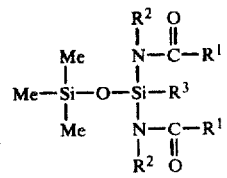

in which Me is a methyl group, $R^1$ is a hydrogen atom or an alkyl or aryl group, $R^2$ is an alkyl or aryl group and $R^3$ is an alkyl group having from 1 to 4 carbon atoms, vinyl group or phenyl group.

* * * * *